United States Patent [19]

Albrecht

[11] 4,219,377
[45] Aug. 26, 1980

[54] PHOTOCURABLE EPOXY COMPOSITION HAVING IMPROVED FLEXIBILITY COMPRISING VINYL TERMINATED ACRYLONITRILE-BUTADIENE POLYMER

[75] Inventor: Donald E. Albrecht, Woodbury, Minn.

[73] Assignee: Minnesota Mining and Manufacturing Company, St. Paul, Minn.

[21] Appl. No.: 20,312

[22] Filed: Mar. 14, 1979

[51] Int. Cl.$^2$ .......................... B05D 3/06; C08F 2/48; C08F 8/00; C08F 19/40
[52] U.S. Cl. ............................... 156/330; 204/159.11; 204/159.14; 204/159.18; 204/159.23; 204/159.24
[58] Field of Search .................. 156/330, 331; 427/53, 427/54; 204/159.11, 159.14, 159.18, 159.23, 159.24; 96/115 R

[56] References Cited

U.S. PATENT DOCUMENTS

| | | | |
|---|---|---|---|
| 3,707,583 | 12/1972 | McKown | 260/837 |
| 3,804,735 | 4/1974 | Radlove et al. | 204/159.14 |
| 3,816,278 | 6/1974 | Watt | 204/159.11 |
| 3,894,112 | 7/1975 | Pagel | 260/830 R |
| 4,092,443 | 5/1978 | Green | 204/159.11 |
| 4,102,686 | 7/1978 | Weinberger et al. | 96/115 R |
| 4,138,538 | 2/1979 | Kaetsu et al. | 204/159.23 |
| 4,141,736 | 2/1979 | Canty | 204/159.11 |

*Primary Examiner*—James C. Cannon
*Attorney, Agent, or Firm*—Cruzan Alexander; Donald M. Sell; Dean P. Edmundson

[57] ABSTRACT

Photocurable epoxy-containing composition having increased flexibility comprising
(a) 100 parts by weight epoxy-containing composition;
(b) 5 to 200 parts by weight vinyl-terminated acrylonitrile-butadiene polymer;
(c) 0.5 to 80 parts by weight actinic light activatable epoxy cure initiator.

The photocureable compositions are particularly suited to cured-in-place applications such as bonding glass to glass.

14 Claims, No Drawings

PHOTOCURABLE EPOXY COMPOSITION HAVING IMPROVED FLEXIBILITY COMPRISING VINYL TERMINATED ACRYLONITRILE-BUTADIENE POLYMER

BACKGROUND OF THE INVENTION

This invention relates to photocurable or actinic light curable epoxy-containing compositions. More particularly it relates to epoxy-containing compositions having improved flexibility.

Conventional actinic light cured or photocured epoxy-containing compositions generally have high internal strength and extreme rigidity which makes them ideally suited for most high performance bonding applications. However, for some applications, conventional photocured epoxy-containing compositions have been found to be too rigid or brittle and attempts have been made to reduce their rigidity (i.e., to flexibilize them or to increase their flexibility). Hydroxyl-functional organic materials have been incorporated into photocurable epoxy compositions to reduce their rigidity. The flexibilization of epoxy-containing compositions with hydroxy-functional materials, although satisfactory for many purposes (e.g., coatings), is generally not sufficient for all purposes or applications (e.g., where greatly improved elongation is required).

SUMMARY OF THE INVENTION

Briefly, in one aspect, the present invention provides a novel photocurable or actinic light curable epoxy-containing composition having therein vinyl-terminated acrylonitrile-butadiene polymer; the cured composition has improved flexibility, impact resistance, toughness and extensibility.

In a further aspect, the present invention provides a photocurable, epoxy-containing composition having improved flexibility when cured, the composition comprising:
(a) 100 parts by weight epoxy containing material;
(b) about 5 to 200 parts by weight vinyl terminated acrylonitrile-butadiene polymer;
(c) about 0.5 to 80 parts by weight actinic light activatable epoxy cure initiator or polymerization initiator, the composition optionally including about 5 to 400 parts by weight hydroxyl-containing organic material, about 0.5 to 100 parts by weight adhesion promoter, and various fillers, additives, photosensitizers, wetting agents, surfactants, etc. to adjust viscosity, color, consistency cure characteristics, handling characteristics and processability of the compositions.

To be "flexibilized" or to have increased flexibility as the terms are used herein means that the elongation at break of a 10 mil (250 micrometer) thick sample is in the range of 5% to 45%, preferably 10% to 30%. "Photocurable" as the term is used herein means initiation of cure of the composition may be accomplished by exposure to actinic light or radiation.

The present epoxy compositions are particularly useful in applications where the rigidity of conventional epoxy compositions is objectionable. The bonding of glass to glass is a particularly noteworthy application of the present flexibilized epoxy compositions because the present flexible compositions tend to be capable of relieving objectionable stress in the bond line. For example, the present epoxy compositions can be employed to bond light element housings to covers therefor e.g., to produce, a sealed beam automobile headlamp. This utility is further described in applicant's copending application entitled "Sealed Lighting Element Assembly", Ser. No. 20,312, filed of even date herewith, incorporated by reference herein.

DETAILED DESCRIPTION OF THE INVENTION

The present invention provides photocurable epoxy containing compositions having improved flexibility by reason of the incorporation therein of vinyl-terminated acrylonitrile-butadiene (VTAB) polymer. VTAB polymers which are useful in this invention have the formula

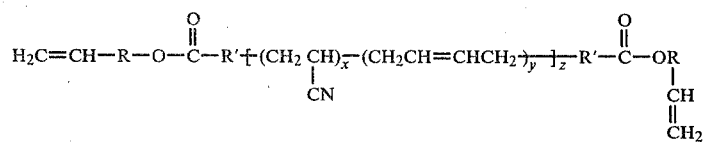

wherein x has a value of 1 to 5, and y has a value of 2 to 10, z has a value of 1 to 20, and R and R' and are independently lower alkylene e.g., having, 1-12 carbon atoms. Useful VTAB polymers generally have a number average molecular weight in the range of about 1,000 to 10,000, preferably 2,500 to 4,500. Useful vinyl-terminated acrylonitrile-butadiene polymers are commercially available for example, from the B. F. Goodrich Company under the trade designation "Hycar" and "VTBN." A particularly useful VTAB material is designated "Hycar 1300×23 (VTBNX)."

Epoxy-containing materials useful in the compositions of the invention are any organic compounds having an oxirane ring polymerizable by ring opening. Such materials, broadly called epoxides, include monomeric epoxy compounds and epoxides of the polymeric type and can be aliphatic, cycloaliphatic, aromatic or heterocyclic. These materials generally have at least one polymerizable epoxy group per molecule (preferably two or more epoxy groups per molecule) and, in the polymeric type there are many pendent epoxy groups (e.g., a glycidyl methacrylate polymer could have several thousand pendent epoxy groups per average molecular weight).

These epoxy-containing materials may vary from low molecular weight monomeric materials to high molecular weight polymers and may vary greatly in the nature of their backbone and substituent groups. For example, the backbone may be of any type and substituent groups thereon can be any group not having an active hydrogen atom which is reactive with an oxirane ring. Illustrative of permissible substituent groups include halogens, ester groups, ethers, sulfonate groups, siloxane groups, nitro groups, amide groups, nitrile groups, phosphate groups, etc. The molecular weight of the epoxy-containing materials may vary from 58 to about 100,000 or more. Mixtures of various epoxy-containing materials can also be used in the compositions of this invention.

Such epoxy-containing materials are well known and include such epoxides as epichlorohydrins, e.g., epichlorohydrin; alkylene oxides, e.g., propylene oxide, styrene oxide; alkenyl oxides, e.g., butadiene oxide; glycidyl esters, e.g., ethyl glycidate; glycidyl-type epoxy resins, e.g., the glycidyl ethers of Bisphenol A and of novolak resins, such as described in "Handbook of Epoxy Resins" by Lee and Neville, McGraw-Hill Book Co., New York (1967), incorporated herein by reference.

Other useful epoxy-containing materials which can be used in this invention are those which contain one or more cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexyl-methyl-3,4-epoxy-2-methylcyclohexane carboxylate, and bis(3,4-epoxy-6-methylcyclohexylmethyl) adipate. For a more detailed list of useful epoxides of this nature, reference is made to the U.S. Pat. No. 3,117,099, incorporated herein by reference.

Further epoxy-containing materials which are useful in the practice of this invention include glycidyl ether monomers of the formula

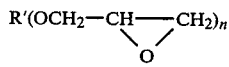

where R' is alkyl or aryl and n is an integer of 1 to 6. Examples are the glycidyl ethers of polyhydric phenols obtained by reacting a polyhydric phenol with an excess of chlorohydrin such as epichlorohydrin (e.g., the diglycidyl ether of 2,2-bis-(2,3-epoxy propoxyphenyl)-propane). Further examples of epoxides of this type which can be used in the practice of this invention are described in U.S. Pat. No. 3,018,262, incorporated herein by reference.

There are a host of commercially available epoxy-containing materials which can be used in this invention. In particular, epoxides which are readily available include propylene oxide, epichlorohydrin, styrene oxide, vinyl cyclohexene oxide, glycidol, glycidylmethacrylate, diglycidyl ether of Bisphenol A (e.g., those available under the trade designations "Epon 828," "Epon 1004" and "Epon 1010" from Shell Chemical Co., "DER-331," "DER-332," and "DER-334," from Dow Chemical Co.), vinylcyclohexene dioxide (e.g., "ERL-4206" from Union Carbide Corp.), 3,4-epoxycyclohexylmethyl-3,4-epoxycyclohexene carboxylate (e.g., "ERL-4221" from Union Carbide Corp.), 3,4-epoxy-6-methylcyclohexylmethyl-3,4-epoxy-6-methylcyclohexene carboxylate (e.g., "ERL-4201" from Union Carbide Corp.), bis(3,4-epoxy-6-methylcyclohexylmethyl) adipate (e.g., "ERL-4289" from Union Carbide Corp.), bis(2,3-epoxy-cyclopentyl) ether (e.g., "ERL-0400" from Union Carbide Corp.), aliphatic epoxy modified with polypropylene glycol (e.g., "ERL-4050" and "ERL-4052" from Union Carbide Corp.), dipentene dioxide (e.g., "ERL-4269" from Union Carbide Corp.), epoxidized polybutadiene, silicone resin containing epoxy functionality, flame retardant epoxy resins (e.g., "DER-580", a brominated bisphenol type epoxy resin available from Dow Chemical Co.), 1,4-butanediol diglycidyl ether (e.g., "Araldite RD-2" from Ciba-Geigy), polyglycidyl ether of phenolformaldehyde novolak (e.g., "DEN-431" and "DEN-438" from Dow Chemical Co.), and resorcinol diglycidyl ether (e.g., "Kopoxite" from Koppers Company, Inc.).

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylate-glycidylacrylate and a 62.5:24:13.5 methylmethacrylate-ethyl acrylate-glycidylmethacrylate.

Still other epoxy-containing materials are the polyurethane polyepoxides which are obtained by reacting an organic polyisocyanate with a triol or a mixture of a triol and diol to form an isocyanate-terminated polyurethane prepolymer and reacting the prepolymer with a hydroxy aliphatic epoxide compound. Further examples of epoxy-containing material of this type which can be used in the practice of this invention are described in U.S. Pat. No. 3,445,436, incorporated herein by reference. Cycloaliphatic epoxides constitute a particularly preferred class of epoxy-containing material herein.

The compositions of the present invention preferably contain therein 5 to 400 parts by weight, preferably 10 to 100 parts by weight (based upon 100 parts epoxy-containing material) hydroxyl-containing organic materials, the material having a hydroxyl equivalent weight in the range of 30 to 2,000. The hydroxyl containing material may be aliphatic, alicyclic, or aromatic, alcohol, carboxylic acid, hydroxy acid, hydroxyl functional ester or mixtures thereof. Such compounds may contain one or a plurality of hydroxyl or carboxyl groups. Aliphatic polyether glycols having a molecular weight in the range of 500 to 2,000 are preferred. Other representative hydroxyl containing organic compounds are the following: ethylene glycol, glycerol, triethylene glycol, bisphenol A, methanol, n-butanol, phenol, o-cresol, m-cresol, p-cresol, resorcinol, o-bromophenol, n-hexanol, and mixtures thereof. A particularly preferred class of hydroxyl containing compounds is polytetramethylene ether glycols commercially available from the Quaker Chemical Company under the trade designation "Polymeg."

The compositions of the present invention further optionally include 0.5 to 100 parts by weight (based upon 100 parts by weight epoxy-containing material), preferably 1 to 50 parts by weight adhesion promoter. By "adhesion promoter" herein it is meant a material which has an affinity for both the substrate and the adhesive, sealant or coating being used. For example, conventional silane compounds such as beta-3,4(epoxycyclohexyl)ethyltrimethoxysilane, and gamma-glycidoxypropyltrimethoxysilane, (both commercially available from the Union Carbide Corporation under the trade designation "A-186" and "A-187" respectively) can be utilized as adhesion promoters where a glass-to-glass bond is intended. Other adhesion promoters or primers are well known to those skilled in the art.

Various fillers, extenders, wetting agents, and surfactants may be utilized to improve the handling properties or performance characteristics of the cured and uncured materials of the present invention. Fillers tend to extend the cured materials as well as decrease their susceptability to moisture permeation. Useful fillers which can be employed in the present invention include aluminum powder, mineral fillers including feldspar and silica, especially the fumed silica commercially available from the Cabot Company under the trade designation "CAB-O-SIL." Other such processing aids, colorants, fillers extenders, and additives will be suggested to one skilled in the art. A particularly noteworthy combination of filler and hydroxyl-containing material to improve the handling properties of the uncured composition is ethylene glycol and fumed silica.

The compositions of the present invention include therein a photoactivatable epoxy cure initiator. Such photoactivatable epoxy cure initiators are generally known in the art and are described in a number of issued U.S. Pat. Nos., e.g., 4,101,513 (Fox et al), 4,039,521 (Smith), incorporated herein by reference. Triarylsulfoniumhexafluoroantimonate (and related antimonate salts) is a particularly preferred photoactivatable epoxy cure initiator for use in the present invention. The aforementioned photoactivatable catalyst is the subject of assignee's copending application Ser. No. 876,114 entitled "Complex Salt Photoinitiator" filed in the name of George H. Smith and Peter M. Olofson on Feb. 8, 1978, and now U.S. Pat. No. 4,173,476, incorporated by reference herein.

Useful photopolymerizable compositions of this invention also include mixtures of two or more epoxy-containing organic materials. For example, it may be desirable to adjust the viscosity, coatability or final cured properties of a photopolymerizable epoxy-containing composition by including therein some amount of an oxetane, alkylvinyl ether or lactone, etc.

The photopolymerizable compositions of the invention can be used as adhesives, caulking and sealing compounds, casting and moulding compounds, potting and encapsulating compounds, impregnating and coating compounds, etc., depending upon the particular epoxy-containing material or materials employed. The present compositions are particularly well adapted for one-part cured-in-place applications.

The actinic light polymerizable compositions of the invention are prepared by simply mixing the components of the admixture under "safe light" conditions (usually just excluding sunlight) it being preferable to have previously melted the solid hydroxyl-containing materials. Suitable inert solvents may be used to aid in obtaining a solution of the materials and to aid in providing a desirable viscosity to the composition. Examples of suitable solvents are acetone, methylene chloride, methanol and includes any solvent which is suitably non-reactive with the components of the admixture. Alternatively, if solventless conditions are desired, the components of the admixture may be dispersed or dissolved in a major component of the admixture, usually the epoxy-containing material.

The polymerization or cure of the compositions of the invention occurs on exposure of the compositions to any source of radiation emitting actinic radiation at a wavelength within the ultraviolet and visible spectral regions. Suitable sources of radiation include mercury vapor, xenon, and carbon arc, sunlight, etc. Exposures may be from less than about 1 second to 10 minutes or more depending upon the amounts and type of the particular epoxy-containing material present, the photoactivatable epoxy curative being utilized, the specific radiation source, the distance from the source to the composition, and the thickness of the composition to be cured.

The curing of the present compositions is a triggered reaction, i.e., once cure of the desired epoxy-containing composition has been initiated by exposing it to a radiation source, the curing reaction proceeds and will continue even after the radiation source is removed. In a preferred practice of the present invention, the epoxy-containing material is essentially completely cured during the period of actinic light exposure. The use of thermal energy before, during, or after exposure to a radiation source will greatly accelerate the curing reaction.

Vinyl-terminated acrylonitrile-butadiene polymers, as described herein also may be used to improve the flexibility of epoxy-containing mixtures which exhibit slow or delayed cure. In such systems the photopolymerizable composition is placed upon one or both of the substrates to be joined (i.e., a bead of the adhesive is formed thereon), the compositions are exposed to actinic light of the proper wavelength for a very brief period, (e.g., 0.02 to 10 seconds for a 200 to 300 watt/inch medium pressure mercury vapor lamp depending upon the composition thickness, its distance from the actinic light source, and the cure initiator employed) and then the substrates are brought together with the irradiated adhesive therebetween. Curing of the irradiated adhesive continues for a relatively long time period after exposure of the adhesive to actinic light (even after the actinic light is removed), the continued curing being referred to as the dark reaction. In this manner opaque or heat sensitive substrates are bonded with the present epoxy-containing materials, there being no requirement that the substrate be either heat or ultraviolet light transmissive so that cure of the adhesive may be initiated. The flexibilized epoxy-containing adhesives produced in this practice of the invention are particularly suited to joining actinic light absorptive materials, e.g., metals and some polymers, and heat-degradable thermosetting or thermoplastic materials such as polymethylmethacrylate or polycarbonate.

It has been found that epoxy-containing materials which exhibit delayed cure (i.e., they have a longer dark reaction than those epoxy-containing materials completely cured while being exposed to actinic light) are polyoxyalkylene mono, di or polyepoxides (especially when used in admixture with other epoxy-containing materials). A specific preferred material is polyoxypropylene diepoxide such as the material available from Dow Chemical Company under the trade designation "DER-736". It is theorized that the catenary oxygen atoms of these materials, in some manner, tend to temporarily inhibit the epoxy cure initiator and thereby provide a significant time period (i.e., an open time) after actinic light irradiation in which the irradiated composition retains its tackiness so that two substrates may be joined. After the substrates have been brought together, the adhesive cures to produce an article having handling strength in a period of from 15 seconds to about 21 hours. The adhesive continues to cure (after reaching handling strength) for a period of 30 seconds to 24 hours to form a bond that is essentially equivalent to a bond which was cured under continuous actinic light exposure.

The delayed cure epoxy-containing compositions preferably have therein a spectral sensitizing dye. Sensitizing dyes are particularly useful in situations where the intensity of the incident actinic light is diminished e.g., by substrate absorption. Further, the portion of the electromagnetic spectrum which will effectuate epoxy cure may be increased by means of spectral sensitizing dyes. Useful spectral sensitizing dyes (which optionally may be used in the non-delayed cure compositions) include anthracene, alkyl and alkoxy substituted anthracenes, xanthones such as 2-chloro-thioxanthone, and substituted acetophenones. The specific useful sensitizing dyes are largely determined by the choice of photoactivatable epoxy cure initiator.

Objects and advantages of this invention are illustrated in the following examples which should not be construed to limit the scope of this invention. All parts are by weight unless otherwise specified.

EXAMPLE 1

Illustrating the preparation of the photocureable epoxy composition of the invention.

A ½ pint (250 ml) epoxy-lined friction top (a conventional paint container) metal container was charged with 71.8 g of cycloaliphatic epoxy "ERL 4221", 30 g of previously melted (heated to about 160° F., 70° C.) polytetramethyleneether glycol "Polymeg 1000", 10 g vinyl terminated acrylonitrite-butadiene polymer "Hycar 1300×23", 10 g gamma-glycidoxypropyltrimethoxy silane "A187" and 11.7 g of a 30% by weight solution of triphenysulfonium hexafluoroantimonate in "ERL 4221". The room temperature mixture was maintained under normal lighting conditions (i.e., in the absence of sunlight) and was stirred at low speed using an air driven 4 bladed impeller ("High Lift" 1.5 inch diameter impeller commercially available from M. F. Fawcett Company) until a uniform mixture was obtained, e.g., 5 min. Four grams of fumed silica ("Cab-o-Sil") was added to the admixture while increasing the impeller speed to ensure complete dispersal of the silica, thus completing the formulation of the composition. At this point the composition was degassed in a vacuum chamber by evacuating to a pressure of about 1 psi (6.7 kPa), this pressure being maintained for 30 minutes at which time no further dissolved gas evolved from the admixture (i.e. bubbling ceased). A dry nitrogen line was attached to an inlet to the vacuum chamber and the chamber was backfilled to atmospheric pressure with dry nitrogen. The composition then was removed from the vacuum chamber.

EXAMPLE 2

Illustrating dry catalyst addition.

The procedure of Example 1 was followed with the exception that 80 parts "ERL 4221" were charged to the container and 3.5 g undissolved triphenylsulfoniumhexafluoroantimonate, (actinic light activatable epoxy cure initiator) was stirred into the composition while heating the mixture to 160° F. (70° C.) by means of a heater blanket, the heating being continued until the initiator dissolved.

EXAMPLE 3

Preparation of a conventional epoxy composition not having VTAB polymer therein.

The procedure of Example 1 was followed with the exception that the vinyl-terminated acrylonitrite-butadiene polymer was omitted and the amount of the "Polymeg 1000" was increased to 40 grams.

EXAMPLE 4

Illustrating the preparation of flexibilized delayed curing epoxy compositions.

The procedure of Example 2 was followed with the exception that mixing time after formulation of the composition was increased to 4 hours (there being no heat applied to the mixture). The composition was as follows:

| | |
|---|---|
| "DER-332" (bispheonl A type epoxy resin) | 68.0 g |
| "DER 736" (polyoxypropylene glycol diepoxide) | 25.0 g |
| "Hycar 1300 × 23" (VTAB polymer) | 7.0 g |
| triphenylsulfoniumhexafluoroantimonate (cure initiator) | 3.0 g |
| technical anthracene (spectral sensitizing dye) | 0.5 g |

EXAMPLE 5

Preparation of delayed curing photocureable epoxy composition without flexibilization.

The procedure of Example 4 was followed with the exception that the "Hycar 1300×23" VTAB polymer was omitted.

EXAMPLE 6

Preparation and evaluation of a cured film.

A polytetrafluoroethylene (PTFE) coated rigid panel was prepared by placing pressure sensitive adhesive backed PTFE tape on a rigid aluminum panel, 6 inches×8 inches (15.2 cm×20.3 cm). A 10 mil thick (250 micrometer) ½ inch wide (1.2 cm) border was placed around the perimeter of the panel, by affixing thereto 2 overlapping layers of 5 mil (125 micrometer) paper backed pressure sensitive tape. A quantity of the composition to be actinic light cured was poured onto the panel and leveled by means of a straight edge to provide a 10 mil thick film. Cure of the 10 mil (250 micrometer) film was initiated by irradiating it for 40 seconds with the actinic light produced by a 200 watt/inch medium pressure mercury vapor lamp separated from the film by a distance of 9 inches. The irradiated film then was allowed to stand in a 77° F. (25° C.), 50% relative humidity environment for 24 hours, thereby permitting any post exposure reactions to occur.

Delayed-curing or post-curing samples (such as in Example 5) are cured by exposing them to the actinic light produced by a 200 watt per inch medium pressure mercury lamp (6 inch separation between mercury lamp and sample) for 0.8 sec. All irradiated samples then are placed in the constant temperature-humidity environment. Sample preparation for all samples is as described in the next paragraph.

Dumbbell shaped specimens were prepared from the film by stamping the films from the panel by means of a metal die, the sample being 2 inches in total length, the bell-shaped end portions being ½ inch in width and tapering to a ⅛ inch wide portion which connects the two bell-shaped end portions and which is 11/16 inches long. The thickness of each sample at the neck (the connecting portion) is recorded and benchmarks are placed ½ inch apart on the neck portion to permit measurement of elongation. The samples then are placed in an "Instron" tester having a jaw separation of 0.5 in/min. While the sample is being elongated (stretched) the separation of the benchmarks is measured by means of dividers. The stress and elongation at rupture are recorded.

If the film sample is to be thermally aged, the remaining portion of the panel is placed between two glass plates (¼ inch thick) in a circulating air oven for 1 hour maintained at 250° F. (120° C.) After aging (and examination for discoloration) the dumbbell shaped specimens are die cut from the panel and tested as described above. Standard test ASTM Designation D-412-68 is the basis for the above test.

TABLE II

| Run No. | Part Ex. 1 Material | Part Ex. 3 Material | % "Hycar" 1300 × 23 | Room temp. tensile strength, psi | R.T. elongation at break, % | 250° F. 1hr aged tensile strength, psi | 250° F. 1hr aged elongation at break % |
|---|---|---|---|---|---|---|---|
| A | 95 | 5 | 1.5 | 3,300 | 5 | 4,700 | 5 |
| B | 90 | 10 | 3 | 3,300 | 5 | 3,400 | 5 |
| C | 85 | 15 | 4.5 | 4,100 | 10-15 | 3,000 | 5 |
| D | 80 | 20 | 5.8 | 2,900 | 15-20 | 5,500 | 5 |
| E | 50 | 50 | 14.6 | 2,200 | 40-45 | 2,400 | 10-15 |

EXAMPLE 7

Flexibility test

One inch by six inch strips are razor cut from panels prepared as in Example 6. The strip is cooled to −20° F. (−28° C.) and held at that temperature for 1 hour. At the end of the hour the strips are grasped on their respective ends and rapidly bent so that the ends are made to touch. The strips then are examined for cracking, fracture, etc.

EXAMPLE 8

The flexibility test of Example 7 was performed with the exception that the strips were tested at room temperature.

TABLE I

Table I contains the tensile strength, elongation at break, 250° F. (120° C.) 1 hr aged tensile strength, and 250° F. (120° C.) 1 hr elongation at break of the materials of Examples 1, 2 and 3 as well as the flexibility test results for Examples 1-5, fracture being considered a failure. These measurements were made in accordance with the procedure of Example 6 and 7.

Table I

| Ex. No. | Tensile strength, psi | Room temp elongation at break, % | 250° F. 1 hr aged tensile strength, psi | 250° F. 1 hr aged elongation at break, % | Flexibility Test −20° F. | Flexibility Test Room Temp |
|---|---|---|---|---|---|---|
| 1. | 2,200 | 20-25 | 5,200 | 5-10 | pass | pass |
| 2. | 2,200 | 20-25 | 5,200 | <5 | pass | pass |
| 3. | 2,700 | <5% | 3,900 | <5 | fails | fails |
| 4. | — | — | — | — | — | pass |
| 5. | — | — | — | — | — | fails |

TABLE II

Further flexibilized epoxy-containing admixtures having different amounts of vinyl-terminated acrylonitrile-butadiene polymer were prepared according to the procedure of Example 1 and tested by the procedure of Example 6. The results of these additional runs are shown in Table II.

It is apparent from Table II that increasing the amount of "Hycar 1300×23" vinyl-terminated acrylonitrile-butadiene polymer tends to increase the elongation at break of the resulting epoxy composition without objectionable reduction in tensile strength thereof.

Various modifications and alterations of the invention will become apparent to those skilled in the art without departing from the scope and spirit of the invention, and it should be understood that this invention is not to be limited to the illustrative embodiments and examples set forth herein.

What is claimed is:

1. A photocureable epoxy-containing composition which exhibits improved flexibility when cured, said composition comprising in admixture:
    (a) 100 parts by weight epoxy-containing material;
    (b) about 5 to 200 parts by weight vinyl terminated acrylonitrile-butadiene polymer;
    (c) about 0.5 to 80 parts by weight actinic light activatable epoxy cure initiator.

2. A composition according to claim 1 wherein said vinyl-terminated acrylonitrile-butadiene has the formula:

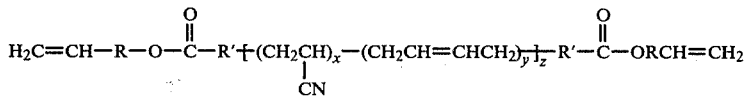

wherein
x has a value of 1 to 5,
y has a value of 2 to 10,
z has a value of 1 to 20, and
R and R' are independently lower alkylene.

3. An admixture according to claim 1 which further comprises 5 to 400 parts by weight hydroxyl-containing organic material.

4. An admixture according to claim 3 wherein said hydroxyl-containing organic material is polytetramethylene ether glycol.

5. An admixture according to claim 1 which further comprises an adhesion promoter.

6. An admixture according to claim 5 wherein said adhesion promoter comprises epoxy functional silanes.

7. An admixture according to claim 1 wherein said epoxy-containing material comprises cycloaliphatic epoxide.

8. An admixture according to claim 7 wherein said epoxy-containing material is polyoxyalkylene epoxide.

9. An admixture according to claim 1 wherein said actinic light activatable epoxy cure initiator is triarylsulfoniumhexafluoroantimonate.

10. An epoxy-containing, photocureable adhesive having improved flexibility where cured, the adhesive comprising in admixture:
    (a) 100 parts by weight epoxy containing material;
    (b) 5 to 200 parts by weight vinyl terminated acrylonitrile-butadiene polymer;
    (c) 5 to 400 parts by weight hydroxyl-containing material (d) 0.5 to 80 parts by weight actinic light activatable epoxy cure initiator;
(e) 0.5 to 100 parts by weight adhesion promoter;
(f) 0.5 to 400 parts by weight filler.

11. A method of bonding substrates comprising the steps of:
(a) providing an admixture comprising an epoxy-containing material having therein vinyl terminated acrylonitrile-butadiene polymer
(b) coating one or both said substrates with said admixture
(c) bonding said substrates at said coating by curing said admixture.

12. A method according to claim 11 wherein said admixture further comprises an actinic light activatable epoxy cure initiator and said bonding step is accomplished by irradiating said coating with actinic light while said substrates are contiguous with the admixture therebetween.

13. A method according to claim 11 wherein said admixture further includes actinic light activatable epoxy cure initiator and said bonding step is accomplished by exposing said admixture coated substrate to actinic light and bringing said substrates together so as to form a bond therebetween.

14. A method according to claim 13 wherein said epoxy-containing material comprises polyoxyalkylene epoxide.

* * * * *